United States Patent
Esses

(10) Patent No.: US 10,609,194 B1
(45) Date of Patent: Mar. 31, 2020

(54) SLIDE GRIP AND KICKSTAND

(71) Applicant: Alfred Esses, Brooklyn, NY (US)

(72) Inventor: Alfred Esses, Brooklyn, NY (US)

(73) Assignee: Alfred Esses, Brooklyn, NY (US)

( * ) Notice: Subject to any disclaimer, the term of this patent is extended or adjusted under 35 U.S.C. 154(b) by 0 days.

(21) Appl. No.: 16/420,377

(22) Filed: May 23, 2019

(51) Int. Cl.
*F16M 13/00* (2006.01)
*H04M 1/04* (2006.01)

(52) U.S. Cl.
CPC .................................. *H04M 1/04* (2013.01)

(58) Field of Classification Search
CPC ................. H05K 5/0204; H05K 5/001; F16B 200/0035; B64D 43/00; F16M 13/00; F16M 13/022; F16M 11/041; F16M 11/105
See application file for complete search history.

(56) References Cited

U.S. PATENT DOCUMENTS

| | | | | |
|---|---|---|---|---|
| 2012/0118770 | A1* | 5/2012 | Valls | F16M 11/10 206/320 |
| 2017/0233093 | A1* | 8/2017 | Sanders | B33Y 80/00 224/401 |
| 2017/0354051 | A1* | 12/2017 | Franz | H05K 7/1489 |
| 2019/0104623 | A1* | 4/2019 | Backus | F16B 1/00 |
| 2019/0111855 | A1* | 4/2019 | Aloe | F16M 11/105 |
| 2019/0317384 | A1* | 10/2019 | Egor | F16M 11/043 |

* cited by examiner

*Primary Examiner* — Amy J. Sterling
(74) *Attorney, Agent, or Firm* — Moritt Hock & Hamroff LLP; Bret P. Shapiro

(57) ABSTRACT

Technologies are generally described for a device. The device may comprise a track with a top layer with walls defining a first oblong opening with a first width and a bottom layer with walls defining a second oblong opening with a second width, larger than the first width. The device may comprise a circular shaped base with a width greater than the first width. The base may be configured to fit and slide within the second oblong opening. The device may comprise a body with a first side attached to the base. The device may comprise a cap. A first side of the cap may be attached to a second side of the base when the cap is in a recessed position and an edge of the cap may be secured to a slot in the second side of the base when the cap is in an extended position.

20 Claims, 6 Drawing Sheets

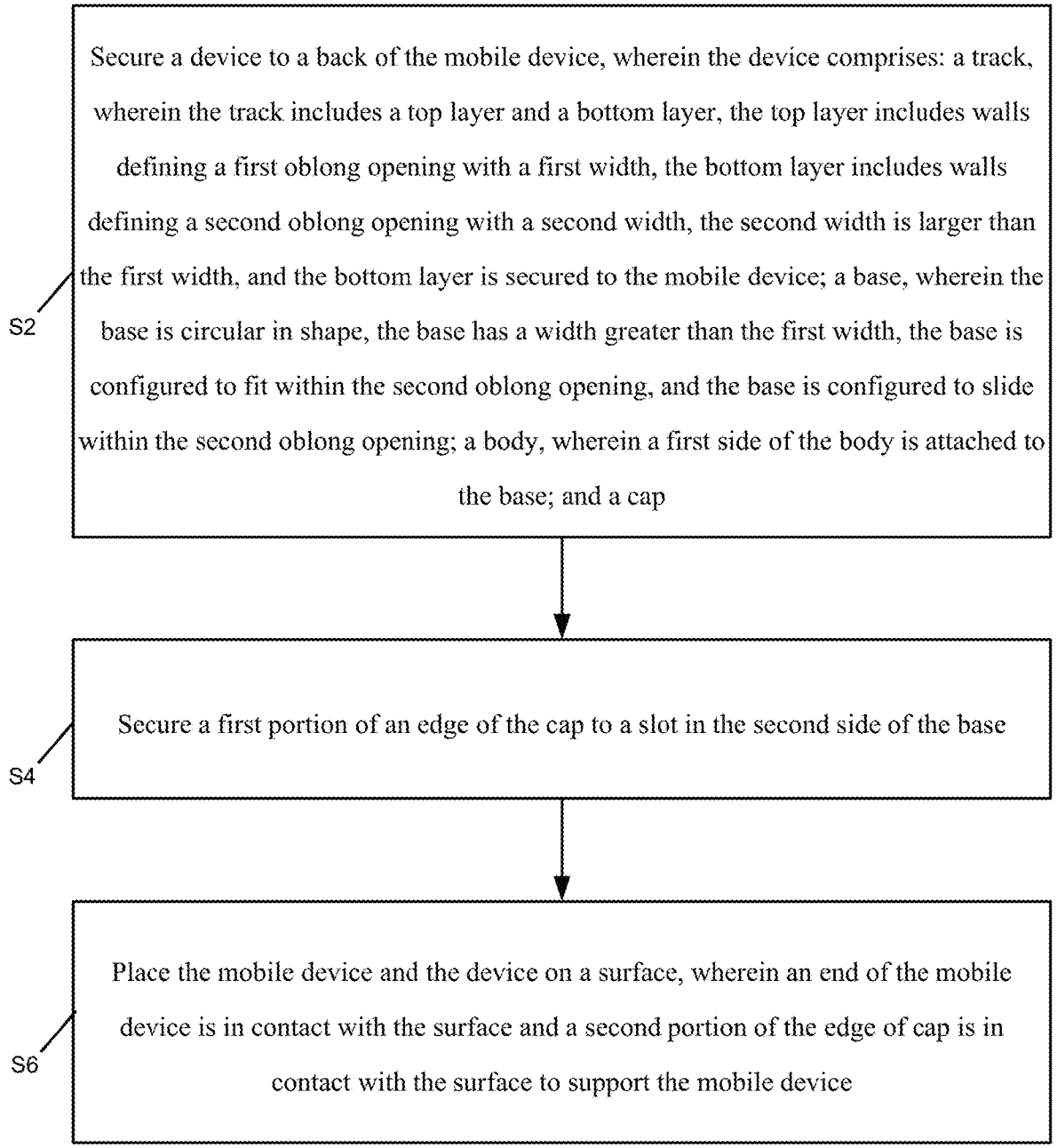

US 10,609,194 B1

SLIDE GRIP AND KICKSTAND

BACKGROUND

A grip may be attached to a mobile device to. A grip may improve handling and control for a user of the mobile device. A grip may be used to position or prop a mobile device.

SUMMARY OF THE INVENTION

One embodiment of the invention is a device. The device may comprise a track. The track may include a top layer and a bottom layer. The top layer may include walls defining a first oblong opening with a first width. The bottom layer may include walls defining a second oblong opening with a second width. The second width may be larger than the first width. The bottom layer may be configured to be secured to a mobile device. The device may comprise a base. The base may be circular in shape. The base may have a width greater than the first width. The base may be configured to fit within the second oblong opening. The base may be configured to slide within the second oblong opening. The device may comprise a body. A first side of the body may be attached to the base. The device may comprise a cap. A first side of the cap may be attached to a second side of the base when the cap is in a recessed position and an edge of the cap may be secured to a slot in the second side of the base when the cap is in an extended position.

Another embodiment of the invention includes a method to support a mobile device. The method may comprise securing a device to a back of the mobile device. The device may comprise a track. The track may include a top layer and a bottom layer. The top layer may include walls defining a first oblong opening with a first width. The bottom layer may include walls defining a second oblong opening with a second width. The second width may be larger than the first width. The bottom layer may be secured to the mobile device. The device may comprise a base. The base may be circular in shape. The base may have a width greater than the first width. The base may be configured to fit within the second oblong opening. The base may be configured to slide within the second oblong opening. The device may comprise a body. A first side of the body may be attached to the base. The device may comprise a cap. The method may comprise securing a first portion of an edge of the cap to a slot in the second side of the base. The method may comprise placing the mobile device and the device on a surface. An end of the mobile device may be in contact with the surface and a second portion of the edge of cap may be in contact with the surface to support the mobile device.

Another embodiment of the invention is a method to to support a mobile device. The method may comprise securing a device to a back of the mobile device. The device may comprise a track. The track may include a top layer and a bottom layer. The top layer may include walls defining a first oblong opening with a first width. The bottom layer may include walls defining a second oblong opening with a second width. The second width may be larger than the first width. The bottom layer may be secured to the mobile device. The device may comprise a base. The base may be circular in shape. The base may have a width greater than the first width. The base may be configured to fit within the second oblong opening. The base may be configured to slide within the second oblong opening. The device may comprise a body. A first side of the body may be attached to the base. The device may comprise a cap. The method may comprise positioning the base with respect to the track. The method may comprise securing a first portion of an edge of the cap to a slot in the second side of the base. The method may comprise placing the mobile device and the device on a surface. An end of the mobile device may be in contact with the surface and a second portion of the edge of cap may be in contact with the surface to support the mobile device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

FIG. 8 illustrates a flow diagram for an example process to method to support a mobile device, all arranged in accordance with an embodiment of the invention.

DETAILED DESCRIPTION

Figure 1:
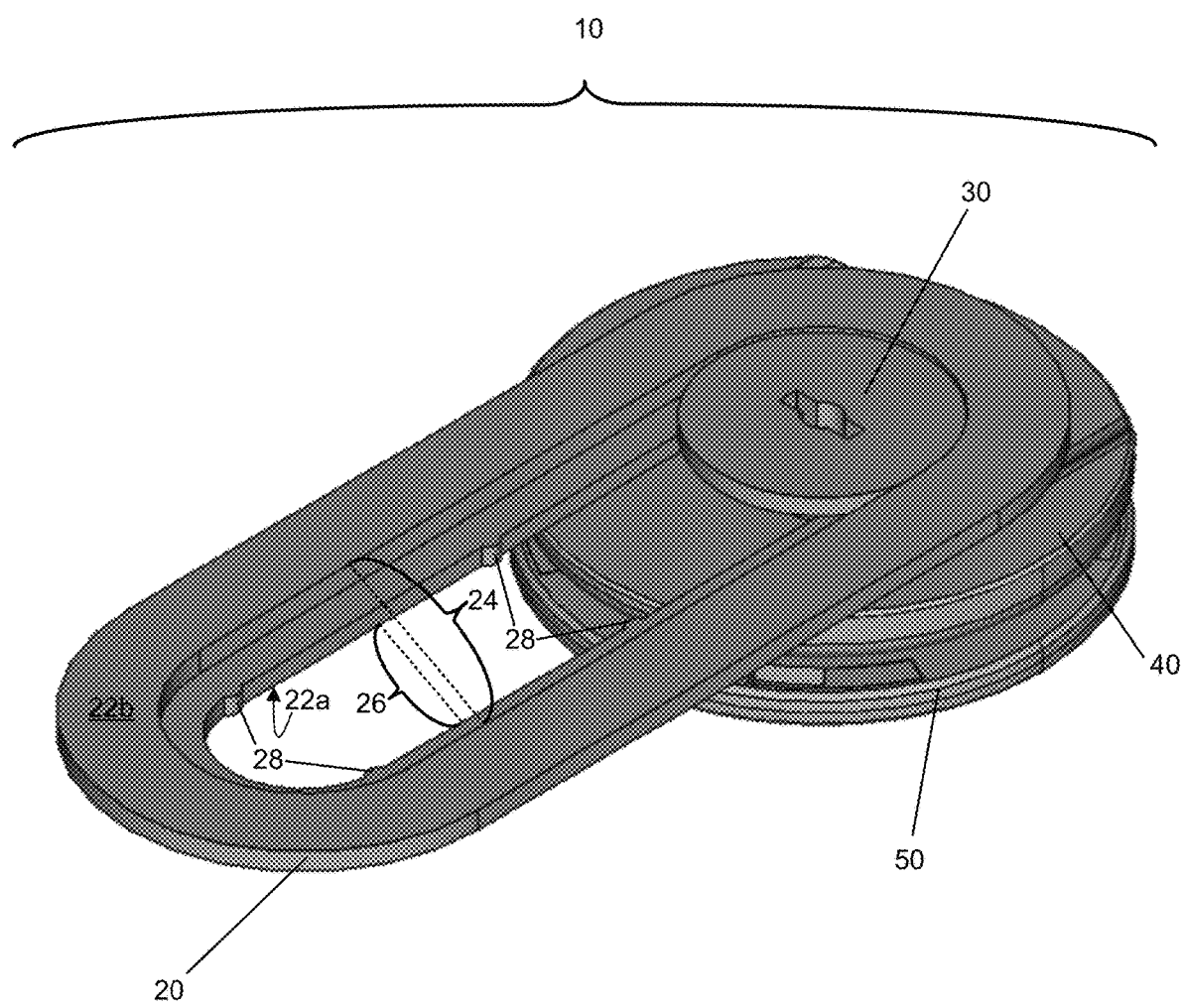
FIG. 1 is a bottom perspective view of a slide grip and kickstand.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Figure 2:
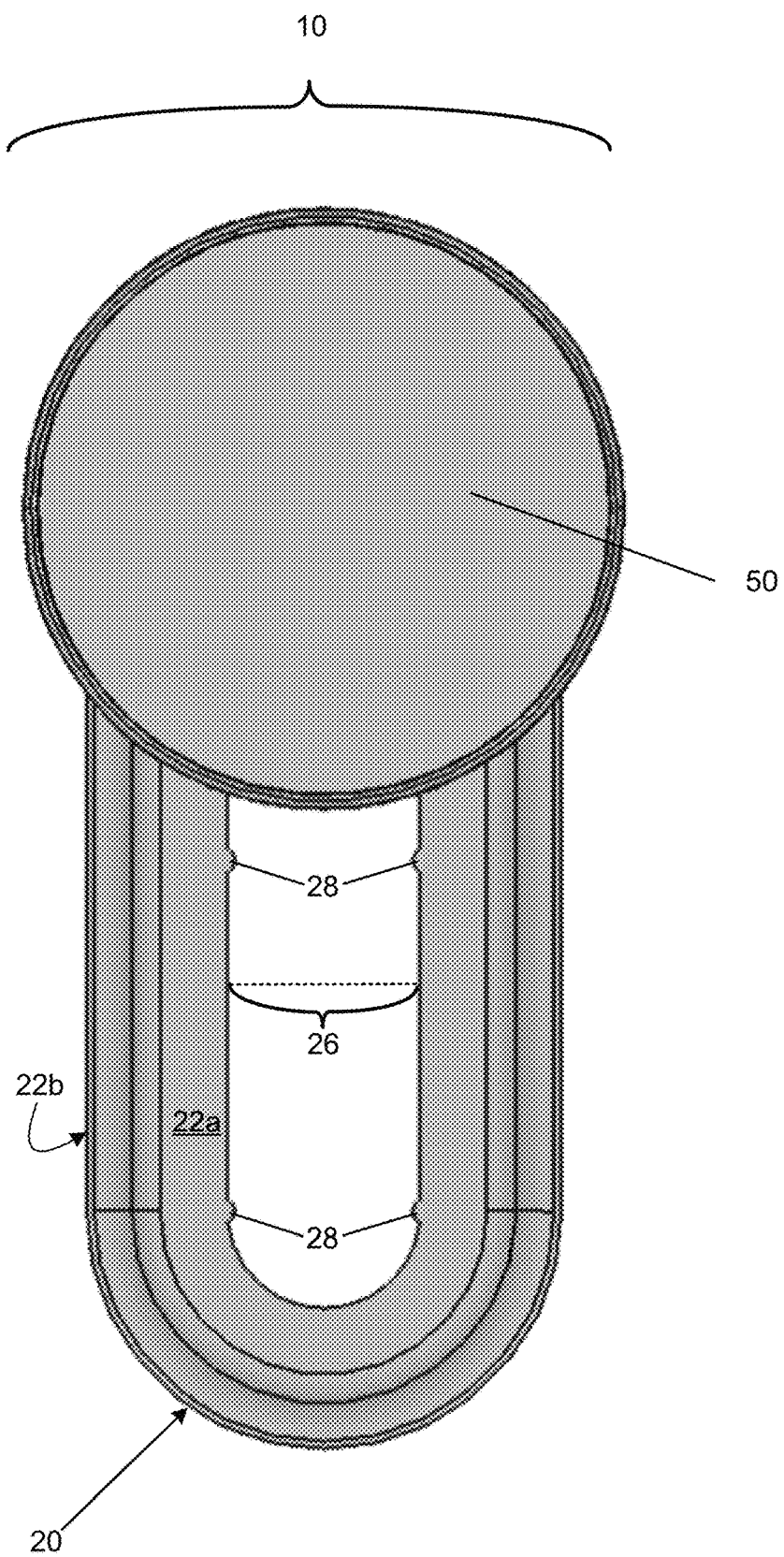
FIG. 2 is a top perspective view of a slide grip and kickstand.

FIG. 1 is a bottom perspective view of a slide grip and kickstand and FIG. 2 is a top perspective view of a slide grip and kickstand in accordance with an embodiment of the invention. As shown in FIGS. 1 and 2, slide gripe and kickstand 10 may include a track 20, a base 30, a body 40, and a cap 50. Track 20 may have an oblong shape. Track 20 may include a top layer 22a and a bottom layer 22b. Bottom layer 22b of track 20 may be configured to be secured to a mobile device. Cap 50 may include material attracted by a magnet, and may be configured to be attachable, and securable, to a magnetic mount.

Bottom layer 22b may include walls defining an oblong opening with a width 24. Top layer 22a may include walls defining an oblong opening with a width 26. Width 24 may be larger than width 26. Base 30 may be circular in shape and may have a diameter similar to width 24. Base 30 may have a diameter larger than width 26. Base 30 may be configured to fit within oblong opening of bottom layer 22b of track 20. Base 30 may be attached to a bottom side of body 40. Base 30 may be configured to slide within oblong opening of bottom layer 22b of track 20. Base 30 may be configured to slide from a first end of track 20 to a second end of track 20 along a length of the oblong opening of bottom layer 22b of track 20. Top layer 22a may include track protrusions 28. Track protrusions 28 may extend into oblong opening with width 26. Track protrusions 28 may be located along a length of oblong opening with width 26, for example, track protrusions 28 may be located at ends of oblong opening with width 26 and at a midpoint along the length of oblong opening with width 26. Track protrusions 28 may be configured to latch into body 40 and secure base 30 and body 40 to a position relative to track 20.

Figure 3:
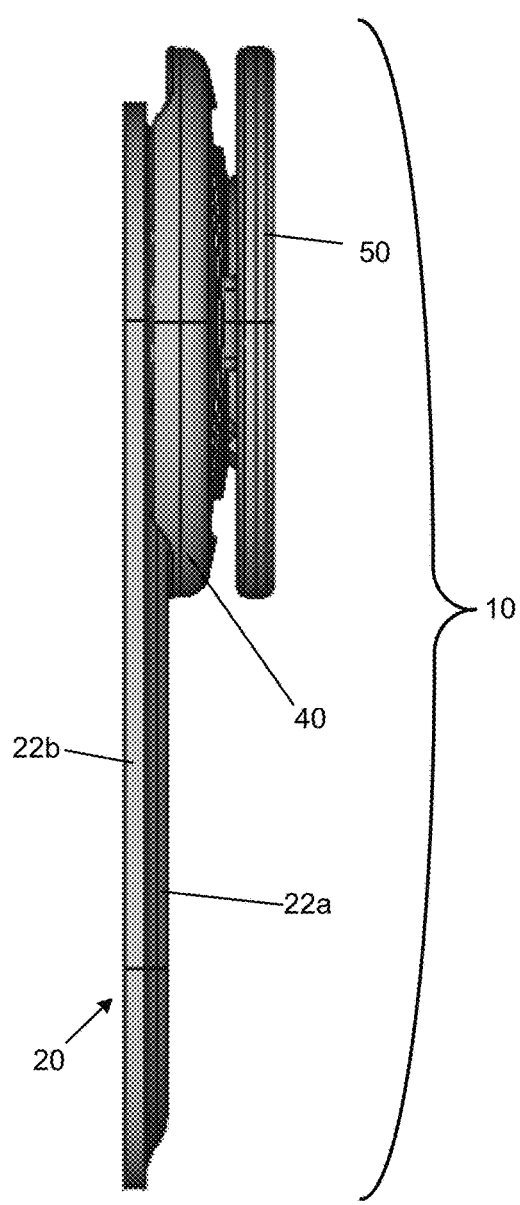
FIG. 3 is a side prospective view of a slide grip and kickstand in a recessed position.
Figure 4:
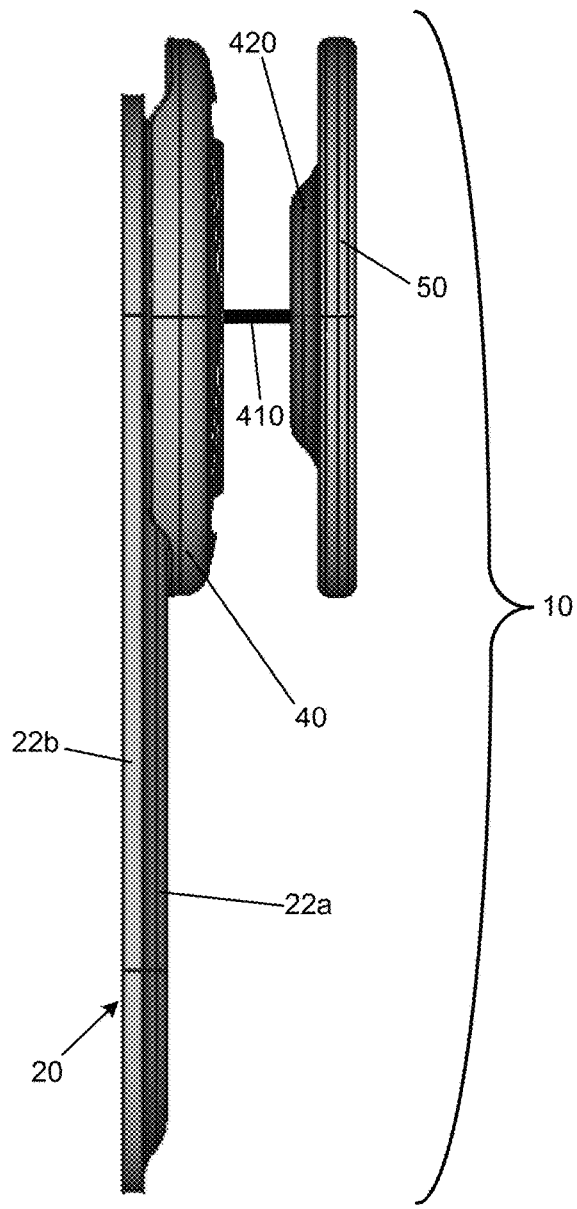
FIG. 4 is a side prospective view of a slide grip and kickstand in an extended position.

FIG. 3 is a side prospective view of a slide grip and kickstand in a recessed position and FIG. 4 is a side prospective view of a slide grip and kickstand in an extended position in accordance with an embodiment of the invention. Those components in FIGS. 3-4 that are labeled identically to components of FIG. 1-2 will not be described again for the purposes of brevity.

As shown in FIG. 3, when slide grip and kickstand 10 is in a recessed position, a bottom side of cap 50 may be secured to a top side of body 40. As shown in FIG. 4, when slide grip and kickstand 10 is in an extended position, a cable or rope 410 may attach bottom side of cap 50 to a top side of body 40. Cable or rope 410 may be elastic or may be under tension, such as being retractable, and may have a first end secured within body 40 and a second end secured within cap 50.

Bottom side of cap 50 may include a projection 420. As shown in more detail below, projection 420 of cap 50 may be configured to fit and fasten into a central cavity defined by walls of top side of base 40. Projection 420, fastened within central cavity defined by walls of top side of base 40 may secure bottom side of cap 50 to top side of body 40 when slide grip and kickstand 10 is in a recessed position.

Figure 5:
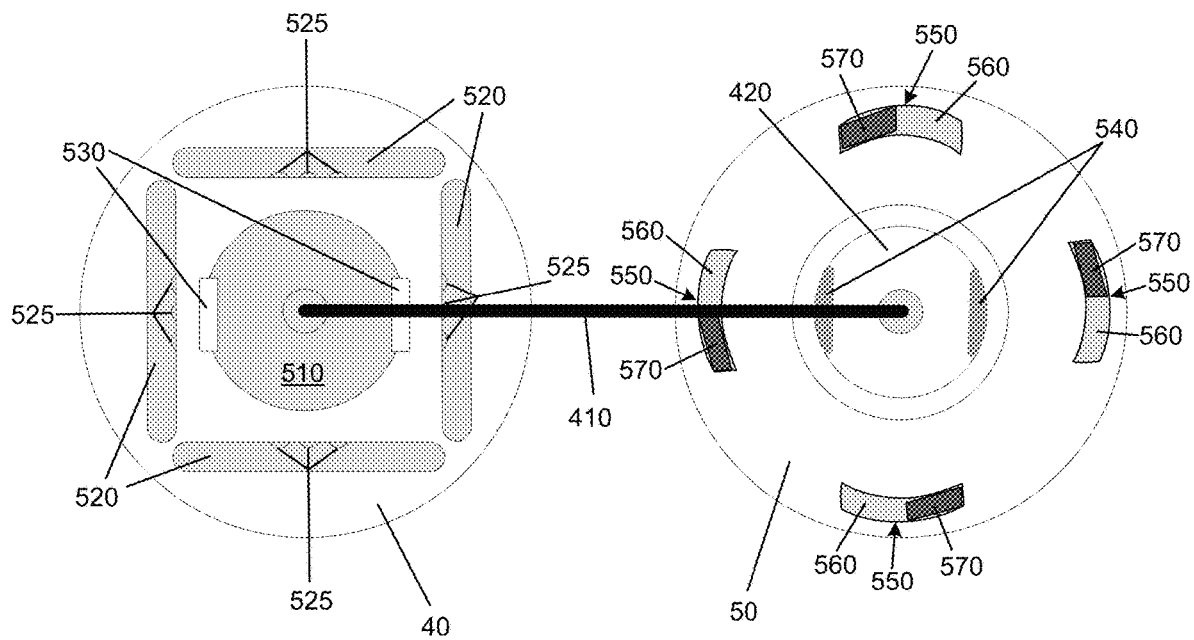
FIG. 5 is top perspective view of a body of a slide grip and kickstand and a bottom perspective view of a cap of a slide grip and kickstand.

FIG. 5 is top perspective view of a body of a slide grip and kickstand and a bottom perspective view of a cap of a slide grip and kickstand in accordance with an embodiment of the invention. Those components in FIG. 3 that are labeled identically to components of FIG. 1-4 will not be described again for the purpose of brevity.

Body 40 may be circular in shape. Top of body 40 may include a central cavity 510, slots 520, slot projections 525, and fasteners 530. Cap 50 may be circular in shape. Bottom of cap 50 may include projection 420, fastener edges 540, and slot fasteners 550. Each slot fastener 550 may include a cavity 560 and a slot tension fastener 570.

Projection 410 of cop 50 may be configured to fit within central cavity 510 on top side of body 40. Fasteners 530 may be tension, friction, or any type of fastener. Fasteners 530 may align with fastener edges 540 of bottom of cap 50. Fastener edges 540 may be textured edges cut out of projection 420 and may be configured to receive and secure to fasteners 530 to attach bottom side of cap 50 to top side of body 40.

Top of body 40 may include four slots 520. Each slot 520 may be perpendicular to an x or y axis of body 40. Slots 520 of top of body 40 may be configured to receive an edge of cap 50. An edge of cap 50 may be inserted into a slot 520 of top of body 40 so that a slot fastener 550 of bottom of cap 50 is aligned with slot projections 525 of a slot 520. Each slot fastener 550 may be configured to receive slot projections 525 and secure edge of cap 50 within slot 520 to form a kickstand. Edge of cap 50 may be secured to a slot 520 of base 40 at an angle. When edge of cap 50 is secured within slot 520, cap 50 may form an angle of 45 to 90 degrees between a plane of top of body 40 and a plane of cap 50. As describe in more detail below, edge of cap 50 secured within slot 520 of top of body 40 may provide a kickstand for a mobile device attached to a slide grip and kickstand.

Figure 6:
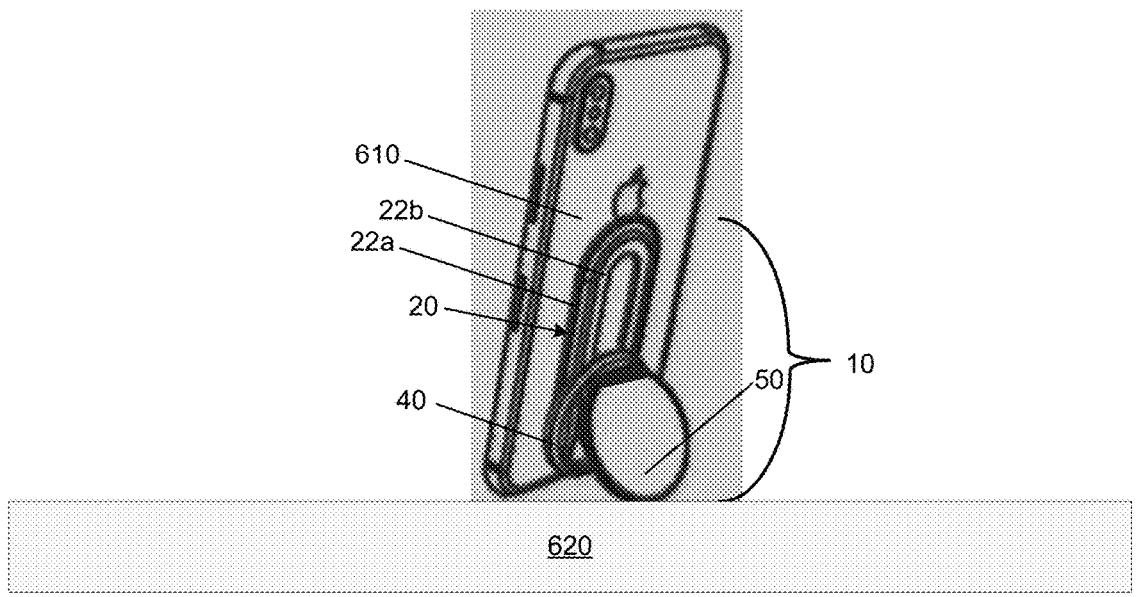
FIG. 6 is a slide grip and kickstand attached to a mobile device in a portrait kickstand position.

FIG. 6 is a slide grip and kickstand attached to a mobile device in a portrait kickstand position in accordance with an embodiment of the invention. Those components in FIG. 6 that are labeled identically to components of FIG. 1-5 will not be described again for the purposes of brevity.

As shown in FIG. 6, slide grip and kickstand 10 may be attached to a mobile device 610. Slide grip and kickstand 10 may be attached to mobile device 610 at bottom side 22b of track 20. Slide grip and kickstand 10 may be attached to mobile device 610 by an adhesive. As described above, body 40 may be positioned within track 20 by securement to track protrusions 28 (shown in FIGS. 1-2). Body 40 may be positioned within track 20 so as to be proximate to a shorter edge of mobile device 610.

A first portion of edge of cap 50 may be secured within a slot 520 of top of base 40 as previously detailed. The first portion of the edge of cap 50 may be secured within any slot 520 of base of cap 40. When cap 50 is positioned as a kickstand and mobile device 610 and slide grip and kickstand 10 are placed on a surface 620, a second portion of the edge of cap 50 may be in contact with surface 620 below mobile device 610 and cap 50. Mobile device 610 may be supported by an end of mobile device 610 in contact with surface 620 and second portion of edge of cap 50 in contact with surface 620.

Figure 7:
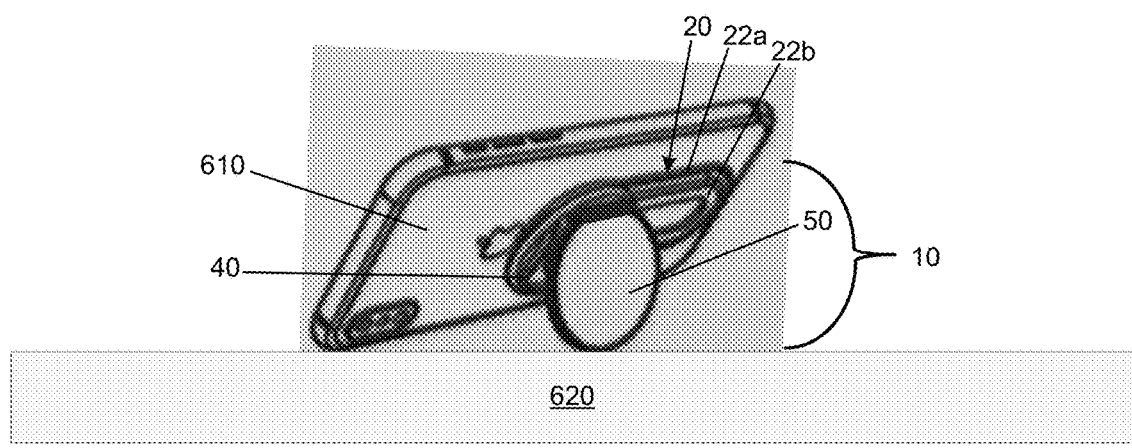
FIG. 7 is a slide grip and kickstand attached to a mobile device in a landscape kickstand position.

FIG. 7 is a slide grip and kickstand attached to a mobile device in a landscape kickstand position in accordance with an embodiment of the invention. Those components in FIG. 7 that are labeled identically to components of FIG. 1-6 will not be described again for the purposes of brevity.

As shown in FIG. 7, slide grip and kickstand 10 may be attached to a mobile device 610. Slide grip and kickstand 10 may be attached to mobile device 610 at bottom side 22b of track 20. Slide grip and kickstand 10 may be attached to mobile device 610 by an adhesive. As described above, body 40 may be positioned within track 20 by securement to track protrusions 28 (shown in FIGS. 1-2). Body 40 may be positioned within track 20 so as to be proximate to a center of mobile device 610.

A first portion of edge of cap 50 may be secured within a slot 520 of top of base 40 as previously detailed. The first portion of the edge of cap 50 may be secured within any slot 520 of base of cap 40. When cap 50 is positioned as a kickstand and mobile device 610 and slide grip and kickstand 10 are placed on a surface 620, a second portion of the edge of cap 50 may be in contact with surface 620 below mobile device 610 and cap 50. Mobile device 610 may be supported by an end of mobile device 610 in contact with surface 620 and second portion of edge of cap 50 in contact with surface 620.

Among other potential benefits, a device in accordance with the disclosure may provide a kickstand for a mobile device that can support the mobile device in both a landscape and a portrait position. Among other potential benefits, a device in accordance with the disclosure may provide a user with a holding grip for a mobile device that can be easily positioned on the mobile device without having to remove the device from the mobile device. Among other potential benefits, a device in accordance with the disclosure may provide a user with a kickstand for a mobile device that can be easily positioned on the mobile device without having to remove the device from the mobile device.

FIG. 8 illustrates a flow diagram for an example process to method to support a mobile device, arranged in accordance with at least some embodiments presented herein. An example process may include one or more operations, actions, or functions as illustrated by one or more of blocks S2, S4, and/or S6. Although illustrated as discrete blocks, various blocks may be divided into additional blocks, combined into fewer blocks, or eliminated, depending on the desired implementation.

Processing may begin at block S2, "Secure a device to a back of the mobile device, wherein the device comprises: a track, wherein the track includes a top layer and a bottom layer, the top layer includes walls defining a first oblong opening with a first width, the bottom layer includes walls defining a second oblong opening with a second width, the second width is larger than the first width, and the bottom layer is secured to the mobile device; a base, wherein the base is circular in shape, the base has a width greater than the first width, the base is configured to fit within the second oblong opening, and the base is configured to slide within the second oblong opening; a body, wherein a first side of the body is attached to the base; and a cap". At block S2, a device may be attached to a back of the mobile device. The device may comprise a track with a top layer and a bottom layer. The top layer may include walls defining a first oblong opening with a first width. The bottom layer may include walls defining a second oblong opening with a second width, and the second width may be larger than the first width. The bottom layer of the track may be secured to the back of the mobile device. The device may comprise a base. The base may be circular in shape and have a width greater than the first width. The base may be configured to fit and slide within the second oblong opening. The device may comprise a body. A first side of the body may be attached to the base. The device may comprise a cap.

Processing may continue from block S2 to block S4, "Secure a first portion of an edge of the cap to a slot in the second side of the base". At block S4, a first portion of an edge of the cap may be secured to a slot in the second side of the base.

Processing may continue from block S4 to block S6, "Place the mobile device and the device on a surface, wherein an end of the mobile device is in contact with the surface and a second portion of the edge of cap is in contact with the surface to support the mobile device". At block S6, the mobile device and the device may be placed on a surface. An end of the mobile device may be in contact with the surface and a second portion of the edge of the cap may be in contact with the surface to support the mobile device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device comprising:
    a track, wherein the track includes a top layer and a bottom layer, the top layer includes walls defining a first oblong opening with a first width, the bottom layer includes walls defining a second oblong opening with a second width, the second width is larger than the first width, and the bottom layer is configured to be secured to a mobile device;
    a base, wherein the base is circular in shape, the base has a width greater than the first width, the base is configured to fit within the second oblong opening, and the base is configured to slide within the second oblong opening;
    a body, wherein a first side of the body is attached to the base; and
    a cap, wherein a first side of the cap is attached to a second side of the base when the cap is in a recessed position and an edge of the cap is secured to a slot in the second side of the base when the cap is in an extended position.

2. The device of claim 1, wherein the top layer of the track includes protrusions which extend into the first oblong opening and are configured to latch onto the body and secure the body to a position relative to the track.

3. The device of claim 2, wherein the protrusions are located at ends of the first oblong opening and at a midpoint along a length of the first oblong opening.

4. The device of claim 1, the second side of the body and the first side of the cap are attached by a cable or rope.

5. The device of claim 4, wherein the cable or rope is elastic or retractable.

6. The device of claim 1, wherein the cap includes material attracted by a magnet.

7. The device of claim 1, wherein the second side of the body includes walls defining a central cavity, the first side of the cap included a projection, and the projection fits into the central cavity to secure the first side of the cap to the second side of the base when the cap is in the recessed position.

8. The device of claim 1, wherein the edge of the cap is secured to a slot in the second side of the base at an angle of 45 to 90 degrees between a plane of the second side of the body and a plane of the cap when the cap is in an extended position.

9. The device of claim 1, wherein the second side of the base includes four slots, and each slot includes projections.

10. A method to support a mobile device, the method comprising:
    securing a device to a back of the mobile device, wherein the device comprises:
        a track, wherein the track includes a top layer and a bottom layer, the top layer includes walls defining a first oblong opening with a first width, the bottom layer includes walls defining a second oblong opening with a second width, the second width is larger than the first width, and the bottom layer is secured to the mobile device;
        a base, wherein the base is circular in shape, the base has a width greater than the first width, the base is configured to fit within the second oblong opening, and the base is configured to slide within the second oblong opening;

a body, wherein a first side of the body is attached to the base; and a cap;

securing a first portion of an edge of the cap to a slot in the second side of the base; and placing the mobile device and the device on a surface, wherein an end of the mobile device is in contact with the surface and a second portion of the edge of cap is in contact with the surface to support the mobile device.

11. The method of claim 10, wherein the top layer of the track includes protrusions which extend into the first oblong opening and are configured to latch onto the body and secure the body to a position relative to the track.

12. The method of claim 11, wherein the protrusions are located at ends of the first oblong opening and at a midpoint along a length of the first oblong opening.

13. The method of claim 10, the second side of the body and the first side of the cap are attached by a cable or rope.

14. The method of claim 13, wherein the cable or rope is elastic or retractable.

15. The method of claim 10, wherein the cap includes material attracted by a magnet.

16. The method of claim 10, wherein the first portion of edge of the cap is secured to a slot in the second side of the base at an angle of 45 to 90 degrees between a plane of the second side of the body and a plane of the cap when the cap is in an extended position.

17. The method of claim 10, wherein the second side of the base includes four slots, each slot includes projections, and the first portion of the edge of the cap is secured to one of the four slots.

18. A method to support a mobile device, the method comprising:

securing a device to a back of the mobile device, wherein the device comprises:

a track, wherein the track includes a top layer and a bottom layer, the top layer includes walls defining a first oblong opening with a first width, the bottom layer includes walls defining a second oblong opening with a second width, the second with is larger than the first width, and the bottom layer is secured to the mobile device;

a base, wherein the base is circular in shape, the base has a width greater than the first width, the base is configured to fit within the second oblong opening, and the base is configured to slide within the second oblong opening;

a body, wherein a first side of the body is attached to the base; and a cap;

positioning the base with respect to the track;

securing a first portion of an edge of the cap to a slot in the second side of the base; and placing the mobile device and the device on a surface, wherein an end of the mobile device is in contact with the surface and a second portion of the edge of cap is in contact with the surface to support the mobile device.

19. The method of claim 18, wherein the top layer of the track includes protrusions which extend into the first oblong opening and are configured to latch onto the body and secure the body to a position relative to the track.

20. The method of claim 19, wherein the protrusions are located at ends of the first oblong opening and at a midpoint along a length of the first oblong opening.

\* \* \* \* \*